Aug. 7, 1945.  F. J. LYDEN  2,381,070
BEARING CONSTRUCTION FOR DYNAMOELECTRIC MACHINES
Filed Nov. 16, 1942  2 Sheets-Sheet 1

INVENTOR.
FRANK J. LYDEN
BY
ATTORNEY.

Aug. 7, 1945.  F. J. LYDEN  2,381,070
BEARING CONSTRUCTION FOR DYNAMOELECTRIC MACHINES
Filed Nov. 16, 1942  2 Sheets-Sheet 2
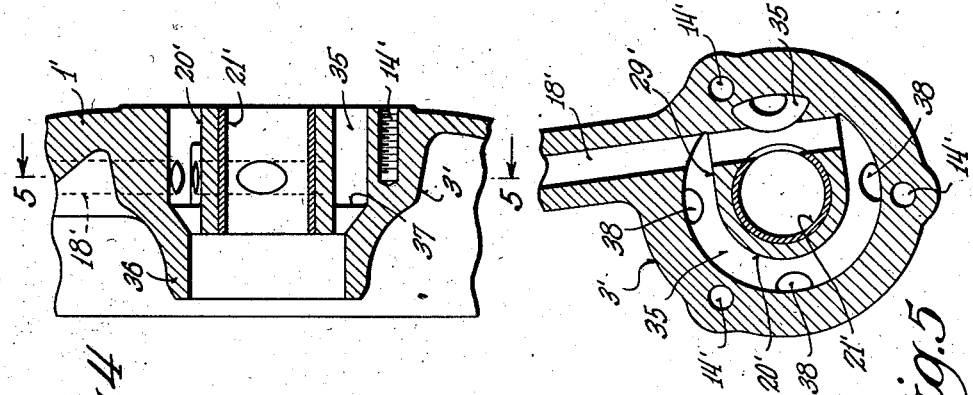
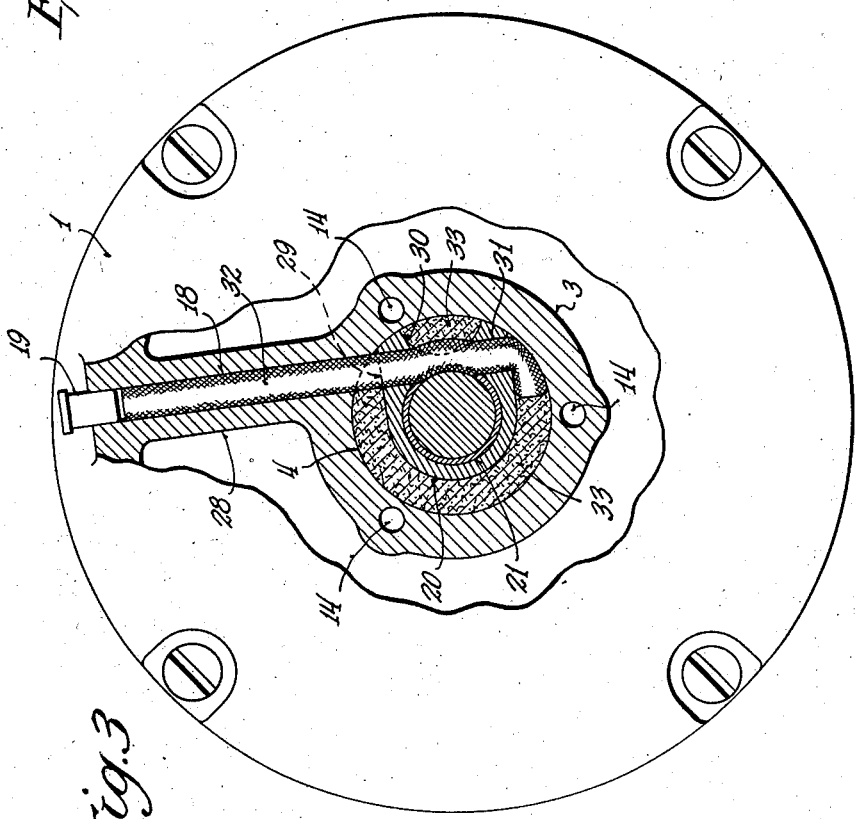
INVENTOR.
FRANK J. LYDEN
BY
ATTORNEY.

Patented Aug. 7, 1945

2,381,070

UNITED STATES PATENT OFFICE 2,381,070

BEARING CONSTRUCTION FOR DYNAMO-ELECTRIC MACHINES

Frank J. Lyden, Erie, Pa.

Application November 16, 1942, Serial No. 465,722

4 Claims. (Cl. 308—125)

This invention relates to bearing constructions for dynamo-electric machines.

Objects of this invention are to provide a bearing construction for dynamo-electric machines which is so made that different types of bearings are interchangeably carried by an end shield so that different styles of electric motors, for instance, can be furnished without requiring a large amount of stock to be carried.

Further objects are to provide a bearing construction for dynamo-electric machines in which an end shield is provided and is bored out and in which ball bearings and sleeve type bearings are provided and are arranged to interchangeably fit within the bored out opening in the end shield, such end shield being provided with a series of tapped holes which can be used from either end thereof so that an end cap can be held in place by screws entering from the outside of the end shield and a sleeve type bearing can be held in place by screws entering the same tapped holes from the inside of the end shield.

Further objects are to provide a bearing construction in which an oil reservoir is provided, in which the oil reservoir is adapted to be filled with an absorbent packing of somewhat resilient material, in which an oil hole extends downwardly from the upper portion of the end shield to the reservoir and is adapted to receive a resilient wick, the construction being such that the oil hole may be drilled downwardly at a slant with reference to a vertical plane so as to form an oval opening through the sleeve on the side thereof in the event a sleeve type bearing is employed, and also so as to enter the oil reservoir, the wick extending downwardly and a part of the wick extending through the oval opening and bearing on the side of the shaft, the wick being somewhat resilient itself and its resiliency being supplemented by that of the oil retaining, resilient packing so that the wick is at all times yieldingly urged against the shaft without requiring the use of auxiliary springs or devices of this nature.

Further objects are to provide a bearing construction in which means are provided for insuring the correct positioning of the drilled hole at the point where it forms an oval opening through the sleeve so that the drill while this hole is being formed will not tend to be deflected but will be relieved on both sides thereof at the time the oval hole is being formed in the sleeve so that there will, therefore, be no tendency for the drill to be deflected sidewise out of its correct position.

Further objects are to provide a bearing construction in which either a separate sleeve bearing may be employed or in which the sleeve bearing may be formed integral, a suitable bushing being provided in each instance and the arrangement of the parts being such that when the drill which is used to form the oil hole passes into the oil reservoir, it will strike a portion of the sleeve bearing at right angles to the axis of the drill so that the drill will continue its progress through the sleeve bearing without being deflected out of its correct position.

Further objects are to provide a bearing construction in which the wick not only extends downwardly through the oil hole but also extends upwardly from the reservoir and is held in intimate contact with the oil absorbing, resilient packing so that the wick conducts lubricant from the oil reservoir to the shaft and has a relatively extensive contact with the shaft due to the oval opening through the sleeve bearing, the arrangement being such that when a ball bearing is substituted for the sleeve bearing, the outer race of the ball bearing at most only partially covers the oil hole.

Embodiments of the invention are shown in the accompanying drawings, in which:

Figure 3 is an end view of the structure shown in Figure 2 with parts broken away and in section.

Figure 4 is a fragmentary view showing a further form of the invention.

Figure 5 is a sectional view on the line 5—5 of Figure 4.

Figure 2:
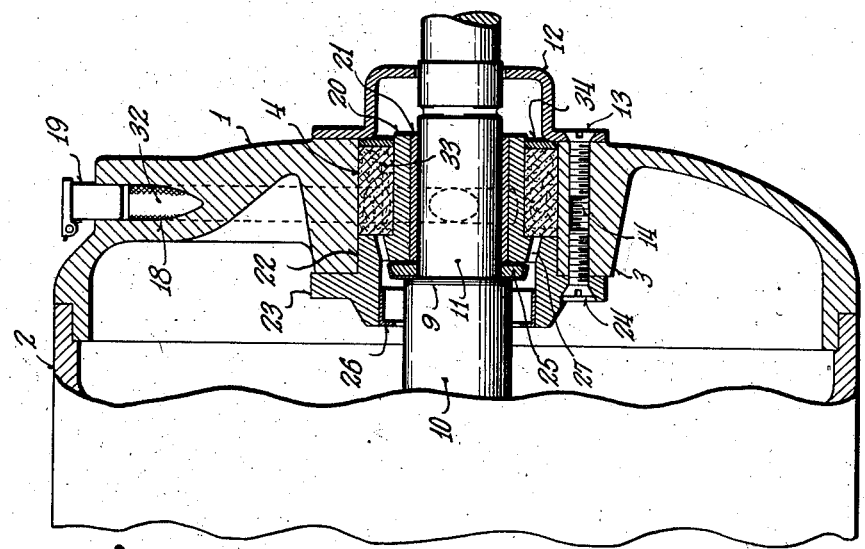
Figure 2 is a similar view showing a sleeve type bearing substituted for the ball bearing and showing the wick and packing in place.
Figure 1:
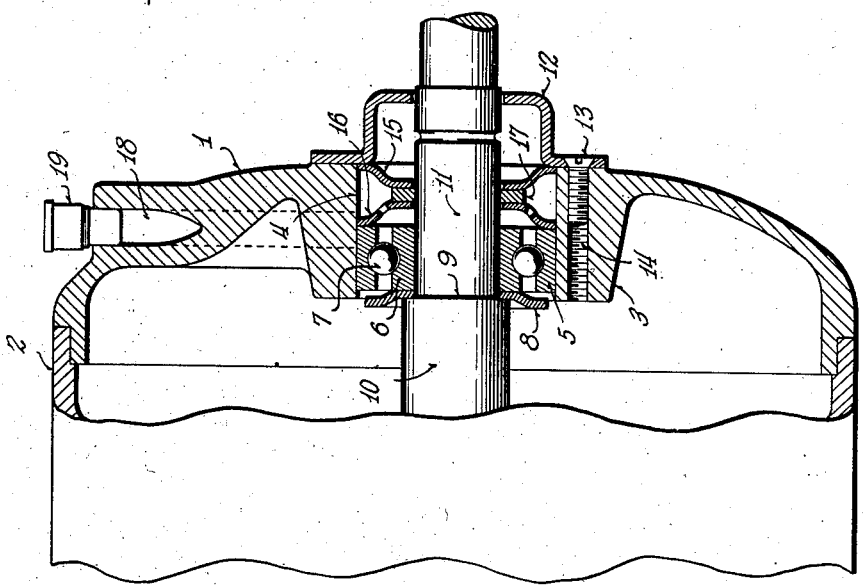
Figure 1 is a fragmentary sectional view through an end shield and ball bearing for a dynamo-electric machine.

In Figures 1, 2 and 3 the same end shield is employed. This end shield is indicated by the reference character 1 and is adapted to close the end of the body portion 2 of a motor or other dynamo-electric machine and may be held in place by means of screws as shown in Figure 3 in the usual manner. This end shield has a bearing housing 3 formed integral therewith and is provided with a hole formed centrally thereof as indicated at 4.

The hole 4 may be bored, broached, or otherwise machined in any suitable manner. The hole 4 is adapted to interchangeably receive a ball bearing or a sleeve type bearing. For example, as shown in Figure 1, the outer race 5 of a ball bearing is pressed into place within the opening 4, the inner race and the balls being respectively indicated by the reference characters 6 and 7. In accordance with the usual practice, a small disk like washer member 8 is positioned between the inner race 6 and the shouldered portion 9 of the shaft 10. The shaft is provided with a reduced portion 11 which may terminate within the end cap 12 or may extend therethrough, the latter construction being shown in the drawings.

The end cap 12 is provided with a plurality of openings, for example three, through which screws 13 extend. These screws enter the outer ends of symmetrically arranged, tapped holes 14 formed in the end shield 1. If the shaft 10 extends outwardly, the cap 12 is apertured to just clear the shaft as shown in the drawings, but it is obvious that when the shaft terminates adjacent the end shield, the end shield is merely a closed cap.

It is preferable to provide a pair of reversely dished washers or spacing members 15 and 16 with an intermediate washer 17 therebetween. The intermediate washer may be formed of somewhat resilient material if desired. It is to be noted that the dished spacing members 15 and 16 assist in bearing the thrust from the outer race 5 as they transmit such thrust to the end cap 12. It is to be noted that an oil hole 18 is drilled downwardly from the upper portion of the end cap and is provided at its outer end with an oil hole closure member 19 of the usual construction provided with a spring pressed cap. The oil hole 18 is positioned axially of the bearing so that it is only partially covered by the outer race of the ball bearing. It also opens to a slight extent into the space between the dished spacer members 15 and 16, it being noted that the spacer member 16 is provided with a plurality of holes so as to allow oil to arrive at the ball bearing.

Referring now to the construction shown in Figures 2 and 3, it will be seen that the end shield 1 hereinbefore described is adapted to receive a sleeve type bearing interchangeably with the ball type bearing heretofore described. This sleeve type bearing includes a bearing support 20 and a sleeve bearing 21 of bronze or other material which is pressed therein and which is spaced inwardly for the majority of its extent from the walls of the bored opening 4 in the end shield 1. This sleeve bearing is provided with an accurately machined cylindrical portion 22 which fits within the bored opening 4 of the end shield 1. It is also provided with a flange 23 having symmetrically arranged openings formed therein which align with the tapped holes 14 formed in the end shield 1. Screws 24 extend through the openings in the flange 23 of the sleeve bearing and are screwed into the tapped holes 14, thus definitely positioning and retaining the sleeve bearing.

It is also possible to have the auxiliary bearing support 20 made of a bearing material such as bronze or a certain type of aluminum alloy, in which case it is unnecessary to have a separate bushing 21.

It is preferable to provide a composite thrust resisting washer 25 which may have a relatively yielding central portion with end disks of metal in accordance with the usual construction. Also if desired a small oil guard ring 26 is pressed into the inner end of the sleeve bearing and has an inturned flange to thus assist in retaining oil.

It is to be noted that there is a space provided between the body portion 20 and the walls of the bored opening 4 in the end shield and that oil holes 27, see Figure 2, extend downwardly in a slanting manner to lead the oil that may arrive just inwardly of the oil shield ring 26 backwardly to the said space between the walls of the bored opening 4 and the body portion 20 of the sleeve bearing.

It is to be noted particularly from reference to Figure 3 that the drilled oil hole 18 extends downwardly from the upper portion of the end shield 1 through a web 28 in a laterally slanting manner. This oil hole extends downwardly through the body portion 20 of the sleeve bearing and opens through the bearing and through the bushing 21 forming a portion thereof so as to form an oval-shaped opening.

In order to keep the drill from being deflected when it passes into the space between the body portion 20 and the walls of the opening 4, it is preferable to provide a surface 29 on the body portion 20 which is at right angles to the axis of the drill as shown in Figure 3. Also it is preferable when the drill begins to form the opening through the bushing 21 and the body portion 20 to have the drill relieved on the opposite side to a similar extent so that the drill will not be deflected at this point. This is easily accomplished by providing an opening indicated at 30 just opposite the bushing 21 and having a radius approximately equal to the inner radius of the bushing 21. Thus the drill will be equally relieved on both sides and will tend to progress without any tendency towards deflection.

The drilling is continued until the hole 31 formed in the body portion 20 of the sleeve bearing opens into the bottom of the reservoir or space between the walls 4 and the body portion 20 of the sleeve bearing. After the end shield has been drilled as described hereinabove, a resilient oil conducting and oil absorbing wick 32 is placed in the opening 18 and extends downwardly so that its lower end is turned laterally below the body portion 20 of the sleeve bearing as shown in Figure 3. Thereafter resilient, oil absorbing packing 33 is positioned in the reservoir space which reservoir space includes the opening 30. Thus the wick is resiliently urged by its own resiliency into relatively extensive engagement with the shaft at the side portion thereof through the oval opening formed in the sleeve bearing. This resilient urging of the wick into contact with the shaft is augmented by the resiliency of the packing in the opening 30. The wick, therefore, will conduct oil from the oil reservoir to the side of the bearing and will insure adequate and free oiling of the bearing at all times. It is to be noted that the wick contacts with the side of the shaft and not with the top thereof and that the wick extends not only from the upper portion of the oil reservoir but also from the lower portion thereof so that an adequate supply of oil is maintained at the bearing at all times.

In small motors it is not necessary to oil them except at widely spaced intervals. At this time the oil may be added through the oiler or closure member 19 in the usual manner and will be conducted downwardly through the wick 32 to the oil reservoir to there be absorbed and held by the absorbent packing 33 as well as by the wick.

It has been proved by experience that more damage is done to small motors by oiling them than to simply rely upon the stored oil in the wool waste packing of the reservoir. The construction as presented here is such that over oiling is almost impossible since the wick 32 will only absorb a certain amount of oil, and will take it only slowly when oil is poured into the oiler 19.

It is to be noted that the outer end of the oil reservoir is closed by means of a washer 34, see Figure 2, formed of metal, fiber or other suitable material. The marginal edges of this washer are held in place by the inner flange of the end cap 12.

The invention also lends itself to the integral construction of the body portion of the sleeve bearing. For example as shown in Figures 4 and 5, the end shield 1' is provided with an integral portion 20' corresponding to the body portion 20 of Figures 2 and 3. An oil reservoir space 35 is provided between the portion 20' and the bearing housing 3' as hereinbefore described, and the drilled hole 18' is formed in the same manner as that hereinbefore described. The portion 20' is provided with a flat upper surface 29' corresponding to the flat surface 29 heretofore described so that such surface 29' will be at right angles to the axis of the drill. A bushing of bronze or other material indicated by the reference character 21' is pressed into the portion 20'. The space 35 is also supplemented by the opening 35' and both spaces 35 and 35' are adapted to be filled with oil absorbent, resilient packing after the oil conducting, resilient wick has been inserted within the oil hole 18' as heretofore described. In this construction symmetrically arranged, tapped holes 14' are provided. These holes, however, do not have to extend clear through to the inner side of the end shield 1'. Instead the inner shield is provided with a projecting annular portion 36 adapted to receive an oil retaining, flanged member corresponding to the member 26 of Figure 2.

It is to be noted particularly with reference to Figures 4 and 5 that the body portion 20' is joined to the main body of the end shield 1 not only at its side as indicated in Figure 5, but also by means of a web 37 at its inner end. This web 37 is provided with a plurality of apertures 38 which communicate with the interior of the projecting portion 36 so that any oil that is caught within the portion 36 is conducted back into the oil reservoir 35 and 35'.

It will be seen that a novel bearing construction has been provided which is easy to produce, which in one form of the invention includes an end shield for an electric motor or other dynamo-electric machine so arranged that it interchangeably receives different types of bearing, such for example as a ball bearing or a sleeve type bearing, and that in this manner a smaller stock need be kept on hand in the assembling plant as the same end shield is used with two wholly different styles of bearings.

It will be seen further that the bearing construction insures the adequate oiling of the bearing with provision for renewal of the oil supply at infreqeunt intervals when it may be required.

It will be seen further that the bearing construction is very simple and may be produced by simple machine shop processes and does not require any elaborate special machining not commonly employed in machine shop practice.

Although this invention has been described in considerable detail, it is to be understood that such description is intended as illustrative rather than limiting, as the invention may be variously embodied and is to be interpreted as claimed.

I claim:

1. A bearing construction for dynamo-electric machines comprising an end shield having a bearing housing integral therewith, a shaft receiving bearing located within said bearing housing and spaced therefrom to provide an oil reservoir, said shaft receiving bearing having a lateral hole therethrough elongated in a vertical direction, said end shield having a downwardly extending and laterally slanting oil hole communicating with said oil reservoir and with the lateral hole in said shaft receiving bearing, and a resilient oil absorbing wick extending downwardly through said oil hole and having a portion projecting laterally of said wick through the lateral hole in said shaft receiving bearing, said wick extending downwardly past said bearing into the lower portion of said oil reservoir.

2. A bearing construction for dynamo-electric machines comprising an end shield having an inwardly projecting, annular, bearing housing integral therewith, a shaft receiving bearing supported from the inner portion of said annular bearing housing and having an inner portion projecting into and spaced from said annular bearing housing to form an oil reservoir below and extending partly around said inner portion, means closing the outer end of said oil reservoir, an oil hole drilled downwardly in a laterally slanting direction through the upper portion of said end shield and through the inner portion of said bearing projecting into said bearing housing to form an elongated hole opening into said bearing and opening into the space below said inner portion, and an oil absorbent wick having inherent resiliency filling at least a part of said oil hole and pressed through said elongated hole in said bearing due to the inherent resiliency of said wick and extending downwardly into the space below the said inner portion, said bearing construction having an oil return hole leading from adjacent the end of the bearing to the space below said inner portion.

3. A bearing construction for dynamo-electric machines comprising an end shield having an inwardly projecting, annular, bearing housing integral therewith, a shaft receiving bearing supported from the inner portion of said annular bearing housing and having a portion projection into and spaced from said annular bearing housing to form an oil reservoir, means closing the outer end of said oil reservoir, an oil hole drilled downwardly in a laterally slanting direction through the upper portion of said end shield and through the portion of said bearing projecting into said bearing housing to form an elongated hole opening into said bearing, a wick located within said oil hole and extending tranversely of said bearing, and oil absorbent material in said oil reservoir, said wick and said material being inherently resilient and cooperating to press said wick laterally through the elongated hole in said bearing.

4. A bearing construction for dynamo-electric machines comprising an end shield having an annular bearing housing integral therewith, a shaft receiving bearing supported from the inner portion of said annular bearing housing and having a portion projecting into and spaced from said annular bearing housing to form an oil reservoir, removable means normally closing the outer end of said oil reservoir, said end shield having an oil hole extending downwardly and communicating with said oil reservoir, said shaft receiving bearing having a hole therethrough communicating with said oil reservoir, and an oil absorbent material positioned within the space between said bearing and said annular bearing housing, said oil absorbent material being accessible from the exterior of said motor when said removable means is removed.

FRANK J. LYDEN.